United States Patent
Bou-Diab et al.

(10) Patent No.: US 9,201,914 B2
(45) Date of Patent: Dec. 1, 2015

(54) METHOD, SYSTEM AND SERVICE FOR STRUCTURED DATA FILTERING, AGGREGATION, AND DISSEMINATION

(75) Inventors: Bashar Said Bou-Diab, Ottawa (CA); Peter Rabinovitch, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 729 days.

(21) Appl. No.: 11/812,422

(22) Filed: Jun. 19, 2007

(65) Prior Publication Data
US 2008/0320128 A1    Dec. 25, 2008

(51) Int. Cl.
*G06F 15/173* (2006.01)
*G06F 17/30* (2006.01)

(52) U.S. Cl.
CPC .................. *G06F 17/30312* (2013.01)

(58) Field of Classification Search
CPC ................................... G06F 17/30312
USPC .......... 709/200, 203, 223, 224; 707/E17.005, 707/E17.032
See application file for complete search history.

(56) References Cited

U.S. PATENT DOCUMENTS

| | | | |
|---|---|---|---|
| 6,766,456 B1 * | 7/2004 | McKeeth | 726/2 |
| 7,536,255 B2 * | 5/2009 | Otsuki et al. | 701/200 |
| 2005/0060372 A1 * | 3/2005 | DeBettencourt et al. | 709/206 |
| 2005/0125199 A1 * | 6/2005 | Slaight | 702/186 |
| 2006/0173995 A1 * | 8/2006 | Moriwaki | 709/224 |
| 2007/0124725 A1 * | 5/2007 | Wang et al. | 717/114 |
| 2007/0179730 A1 * | 8/2007 | Bornhoevd et al. | 702/116 |
| 2008/0133608 A1 * | 6/2008 | Brown et al. | 707/200 |
| 2008/0215609 A1 * | 9/2008 | Cleveland et al. | 707/102 |

* cited by examiner

*Primary Examiner* — Peter Shaw
(74) *Attorney, Agent, or Firm* — Kramer & Amado, P.C.

(57) ABSTRACT

A system and method of processing data, including identifying a first data processing criteria, communicating the first data processing criteria from a data processing application to a network element, receiving sensor data from a plurality of sensors at the network element, operating on the sensor data at the network element to process the data according to the identified first data processing criteria, resulting in a first processed data result, transmitting the first processed data result from the network element to the data processing application, and processing the first processed data result at the data processing application resulting in a second processed data result. The criteria can be dynamically updated.

18 Claims, 2 Drawing Sheets

METHOD, SYSTEM AND SERVICE FOR STRUCTURED DATA FILTERING, AGGREGATION, AND DISSEMINATION

BACKGROUND OF THE INVENTION

1. Field of the Invention

This invention relates generally to a method, system and service for structured data filtering, aggregation, and dissemination.

2. Description of Related Art

The subject matter described herein relates to systems and methods where data is obtained and then processed. Some such systems and methods include a communications network through which data is transferred. Further, some such systems and methods include an application that receives the data and processes the data. In such systems and methods, there is a need for efficiently operating the application that processes the data, and a need for efficiently communicating the information contained in the data to the application that processes the data.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a method, system and service for structured data filtering, aggregation, and dissemination, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Sensor networks technology refers to the ability of a sensor to send data in an extensible markup language (XML) document using a network technology, the ability to query the data, and an application for processing the sensor data. Large investments are often made in systems related to sensor networks technology.

An example is where a multitude of motion sensors are installed to prevent an intruder in a defensive area. Another example of a system with a large investment related to sensor networks technology includes the prevention of unauthorized entry into a network by a hacker where the network acts as a sensor and provides data.

In the foregoing example, more than one identification of an attempt in unauthorized entry is required according to one criteria in order for an identification to be made that a hacker is seeking unauthorized entry. It should be apparent that homeland security, network defense, and other applications result in many different scenarios involving large scale deployment of sensors. Other examples of such applications include chemical, biological, radiological, nuclear, and other types of sensors related to network defense and security.

These applications result in a large amount of real-time information produced by sensors in the form of data and requiring monitoring by data processing and monitoring applications.

However, any giving data processing or monitoring application has a limited and finite amount of processing and bandwidth capability. These limitations are believed to result in practical limits on the number of sensors that may be deployed in sensor networks technology below a threshold desired for the network. In other words, many applications may exist where a data processing or monitoring application is prevented from monitoring or processing all of the raw data produced by sensors in a sensor network in real-time.

Thus, various exemplary embodiments filter or aggregate the data to combine the data and remove redundant data before the filtered or aggregated data is received by the data processing application. Further, various exemplary embodiments afford an easy means to update the filtering or aggregating criteria operating on the data. In this manner, various exemplary embodiments connect sensor networks to data processing applications in an improved manner.

Various exemplary embodiments include a functionality addressable in an Internet protocol (IP) communication network thereby providing the ability to offer interactive or dynamic data filtering or aggregating whereby the standard for filtering or aggregating the data may change. For example, if a data spike is identified in a particular locale in a particular application, the filtering and aggregating standard is altered by communicating a new standard wherein all data from the locale where the spike occurred is transmitted to the data processing application.

It should be apparent that this is vastly superior to dissemination services in a communication network whereby all of the sensors merely push all of their data into the network without knowing where that data is going. Various exemplary embodiments are much more robust than such dissemination services. In particular, in various exemplary embodiments, data is only disseminated to destinations that have expressed a prior interest in that data, using the web service's application programming interface (API).

In the past, a router (or other network element) and a server had no means by which to understand the meaning of data being transmitted therethrough unless the router or other network element and the server were told specifically how to parse that data. In various exemplary embodiments using XML, a generic and open technology for structuring the data, such as delimiters for every field, make the data within XML document structured.

Thus, in XML aware networking, an XML router is able to parse a document as structured because the XML router is aware of the XML schema defined for the structure. This is a vast improvement upon systems where a router in a network only looks at the network header of data transferred through the router.

Thus, various exemplary embodiments implement conditional processing or query-based processing. This describes the system where it is possible to match data from its source and, if the data is not from a desired source, making an informed decision not to continue to transmit that data through the network to a data processing application. In other words, conditional processing is implemented on data based on the data itself.

Taking this specific example of the foregoing, imagine that data is being received from a plurality of sensors in a plurality of neighborhoods. However, a criteria has been defined that only the data from a particular neighborhood is to be evaluated. Later, the criteria is updated to look only at the data coming from a different neighborhood.

It should be apparent that, in some embodiments, much more complex application queries specifying results to be calculated for applications from real-time structured data are distributed around a communication network to distribute the data aggregation task intelligently around the network. In the foregoing manner, the data aggregation task is distributed in various exemplary embodiments to intelligently balance bandwidth demands with aggregation efficiency and accuracy. Thus, a plurality of network elements are used in various exemplary embodiments to process real-time information and aggregate or manipulate the data corresponding to that information according to application specifications.

The subject matter described herein overcomes problems associated with existing methods and systems for processing data by taking some or all of the functionality that exists in a data processing application and moving it from the data processing application into a remote network element. In other words, processing requirements of a data processing application are offloaded from the data processing application to a communication network. The associated specifics are described in greater detail below.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
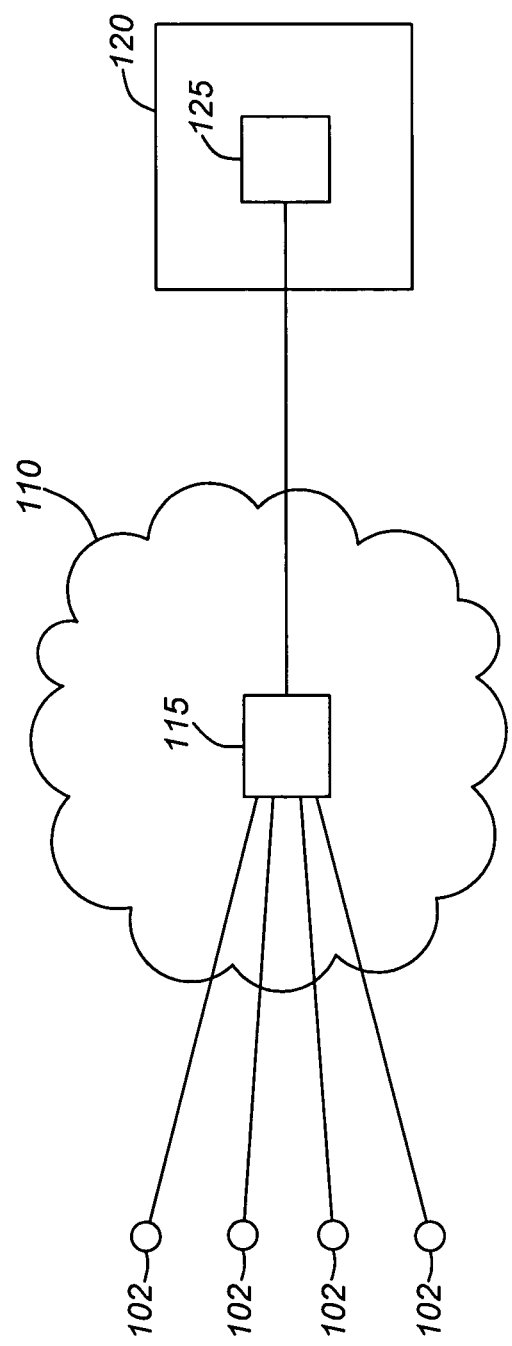
FIG. 1 is a schematic diagram of an exemplary embodiment of a system for structured data filtering, aggregation and dissemination.

In many systems and methods for data processing, it is necessary for all data to be transferred to an application that processes the data. Unfortunately, when the volume of data in the system is high, such systems and methods often result in slowing down the speed at which the application can operate and process the data, perhaps even overloading the system and application. The subject matter described herein overcomes these problems.

One approach to overcoming the problems described above is referred to as data fusion. Data fusion pertains to systems and methods wherein a subset of all the available data is evaluated to draw a conclusion intended to simulate the conclusion that would be drawn if all of the available data were evaluated in the same manner.

Data fusion is designed to overcome processing burdens placed on a data processing application by reducing the volume of data that the application must process. However, data fusion introduces a new problem because all of the data is not actually evaluated. Because all of the data is not actually evaluated, the conclusion drawn by a data fusion system and method might err with respect to the conclusion that would be drawn if all the available data were actually evaluated. The subject matter described herein overcomes the problems associated with data fusion methods and systems.

Various exemplary embodiments are directed at the problem of dynamically and intelligently aggregating (associating, correlating, combining) high-volume real-time data from multiple sources inside a network and to provide multiple applications with refined data at speeds commensurate with their specifications and capabilities.

Various exemplary embodiments relate to application aware network-resident services, particularly distributed asynchronous application-aware data filtering, aggregation and dissemination. Various exemplary embodiments improve on publish-subscribe application overlays by including a data aggregation function.

Publish-subscribe communication is a messaging model. Messaging is the exchange of messages (specially-formatted data describing events, requests, and replies) to a messaging server, which acts as a message exchange program for client programs. In publish-subscribe, subscribers register their interests in a topic or a pattern of events and then asynchronously receive events matching their interest from the messaging server, regardless of the events' publisher. The strength of an event-based interaction style is drawn from full decoupling in time, space and flow between publishers and subscribers.

In various exemplary embodiments, structured data is exchanged with structured messages such as XML defined messages whose format is specified via an XML schema where the XML message consists of reference(s) to its structure definition and of multiple elements. XML is a flexible way to create common information formats and share both the format and the form data on the World Wide Web, intranets, and elsewhere.

This field is sometimes known as XML routing. The subject matter described herein is achieved, in various exemplary embodiments, by offloading data filtering and processing functions from a data processing application to a network element or network elements using XML routing.

Thus, the subject matter described herein is beneficial to networks such as RFID networks and sensor networks. XML enables a router or other network element to process data in a manner that is independent of an application.

XPath is a language that describes a way to locate and process items in XML documents by using an addressing syntax based on a path through the document's logical structure or hierarchy. Various exemplary embodiments use XPath.

XQuery is a specification for a query language that allows a user or programmer to extract information from an XML file or any collection of data that can be XML-like. Various exemplary embodiments use XQuery.

In various exemplary embodiments, a publish-subscribe system is employed as an application-independent application-level XML multicast router. A publish-subscribe messaging server that uses XPath and XQuery technologies allows for real-time, asynchronous group communication between clients. Thus, in various exemplary embodiments, an XML publish-subscribe system is used as a content-aware XML service router with self-managing XML multicast.

In various exemplary embodiments, structured data, such as XML messages, is aggregated across multiple dimensions, including one or more of the following. Temporal aggregation includes calculating the average, maximum, or minimum, for example, over a period of time. Spatial aggregation includes calculating the average, maximum, or minimum, for example, over bounded space. Attribute bin aggregation includes aggregating space and time for each discrete value of an attribute. For example attribute bin aggregation includes aggregating time and space where a temperature measurement yielded 1 degree Celsius.

Various exemplary embodiments have benefits with respect to one or more of the following trends or problems. Large scale deployments of sensor networks are currently, or may in the future be used, for example, for purposes such home-land security, crisis-management, network intrusion detection, and so on. Situational awareness monitoring applications are required to aggregate, fuse or present large amounts of real-time raw information from a large number of sources. The bandwidth and processing demands of large sensor network deployments make such solutions economically prohibitive.

A lack of a standardized network-resident data fusion or aggregation service restricts sensor network deployments to locally isolated islands of information that are costly to integrate into a comprehensive monitoring network. Also, new means of revenue generation will be increasingly in demand by carriers as they build out their new triple play infrastructures (IP aware access and aggregation) and seek revenue generating services.

Various exemplary embodiments include filtering, aggregation and dissemination (FAD) components distributed in, and addressable within, a communication network (IP network) forming an application overlay FAD network. The FAD network logically connects structured data streaming sources, such as sensor nodes, to data processing applications or other data sinks. In various exemplary embodiments, one or more advantages described herein are achieved by the FAD network because it improves on the capability of publish-subscribe filtering and dissemination overlays by including a data aggregation function.

Referring now to the drawings, in which like numerals refer to like components or steps, there are disclosed broad aspects of various exemplary embodiments.

FIG. 1 is a schematic diagram of an exemplary embodiment of a system 100 for structured data filtering, aggregation and dissemination. The system 100 includes four sensors 102. The four sensors 102 represent the sensor network. In various exemplary embodiments, as described in detailed herein, the sensor network containing sensors 102 is very large. However, it should be apparent that, in other embodiments, the sensor network contains a smaller number of sensors 102.

The sensors 102 transmit data to a network element 115 in a network 110. The network element 115 operates on the sensor data transmitted from sensors 102 to filter or aggregate the data. The network element 115 then transmits the filtered or aggregated data from data sensors 102 to a data processing application 125 included in a data processing workstation 120. These various functions of the network element 115 and the data processing application 125 are described in greater detail herein.

Figure 2:
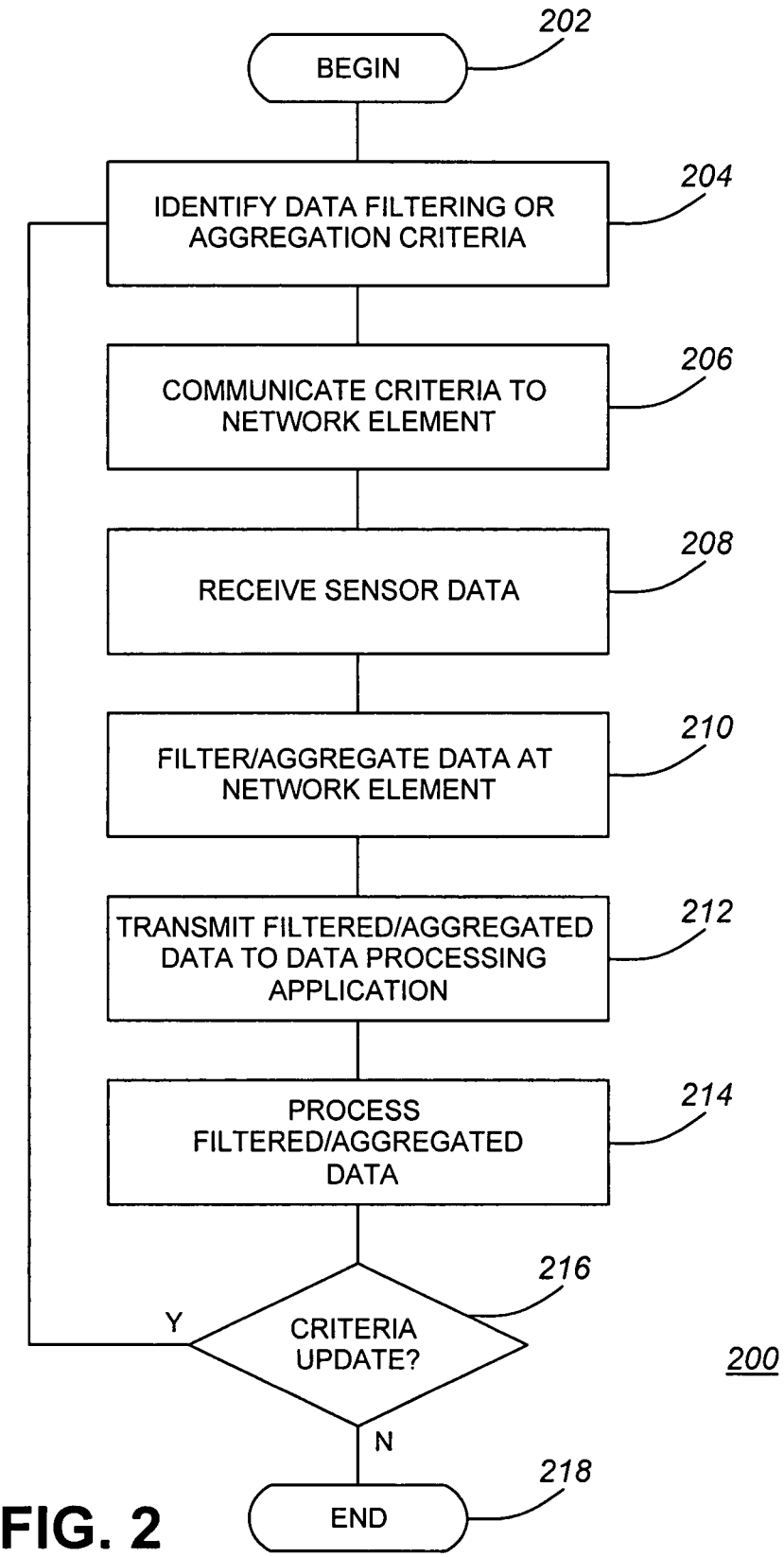
FIG. 2 is an exemplary embodiment of a method of structured data filtering, aggregation and dissemination.

FIG. 2 is an exemplary embodiment of a method 200 of structured data filtering, aggregation and dissemination. The method 200 begins in step 202 and continues to step 204. In step 204, one or more criteria are identified for data filtering or aggregation.

The method 200 then proceeds to step 206 where the criteria identified in step 204 is communicated to the network element 115 from the data processing application workstation 120. The method 200 then proceeds to step 208.

In step 208, sensor data is received from the sensors 102 at the network element 115. It should be apparent that the network element 115, as shown in FIG. 1, can represent more than one network element 115 in other exemplary embodiments. The method 200 then proceeds to step 210.

In step 210, the data received from the data sensors 102 is filtered or aggregated at the network element 115 according to the criteria communicated to the network element 115 in step 206. The method 200 then proceeds to step 212.

In step 212, the results of the filtering and aggregation of the data that took place at the network element 115 in step 210 is transmitted from the network element 115 to the data processing application 125. The method 200 then proceeds to step 214.

In step 214, the data processing application 125 processes the filtered or aggregated data received from the network element 115. The method 200 then proceeds to step 216.

In step 216, an evaluation is performed whether the criteria for data filtering or aggregation identified in step 204 and communicated in step 206 needs to be updated. If the criteria for data filtering or aggregation needs to be updated, the method 200 returns to step 204.

If a determination is made in step 216 that the criteria for data filtering or aggregation does not need to be updated, the method 200 proceeds to step 218 where the method 200 ends. It should be apparent that additional details regarding the steps of the method 200 are described herein.

In various exemplary embodiments, the data processing applications or other data sinks specify the data they are interested in via queries with spatial, temporal, or attribute-based conditions. This is accomplished, for example, using XPath or XQuery languages. In various exemplary embodiments, the data processing application or other data sink also specifies the type of aggregation desired. For example, the data processing application may specify a combination of spatial, temporal, or attribute based aggregation, to the FAD network components they are associated with. This is done, for example, using XML constructs, such as where XML is used to define an interface enabling clients to communicate because of the delimiters and other field identifiers included in the XML schema.

In various exemplary embodiments, each FAD network component aggregates the FAD queries and disseminates the FAD query aggregates across the FAD network. In various exemplary embodiments, each FAD component then stores the FAD query aggregates in a FAD information base (FADIB).

Streaming sources, such as sensor nodes, send structured data asynchronously to the FAD component they are associated with. In various exemplary embodiments, the data has one or more of geospatial, temporal, geographic, numeric, and textual attributes. Thus, examples of data include time, temperature, humidity, presence of a biological or other substance in the air, latitude, longitude, height such as height above sea level or height above ground, geographical place name including street name, city name, or other municipal or political boundary, and so on. Thus, in various exemplary embodiments, upon reception of a message (structured data) from a source, a FAD component matches the message with entries (FAD policies) in its FADIB (FAD Information Base) and filters, aggregates and/or disseminates elements of the message according to the matched FAD policies.

For example a FAD policy may result in extracting a temperature measurement for a specific location at a specific time from the message and updating a temperature time-average. The temperature average aggregated across specified time and space is periodically disseminated to FAD components as expressed in the FADIB.

Complicated examples of aggregation according to various exemplary embodiments include the following: satisfying a condition a predetermined number of times consecutively; satisfying a condition a predetermined number of times out of a larger predetermined number of consecutive times; and satisfying a condition of predetermined number of times out of the sum of the predetermined number of times plus an additional buffer number of times. It should be apparent that a wide variety of standards or policies are implemented in various exemplary embodiments with respect to the criteria for aggregating data.

As an example, consider the following scenario. An agency has a large temperature sensor network used for monitoring a large geographical area for forest fires. If each sensor continually sends temperature readings to the monitoring application, the application may become overwhelmed by the volume of that data.

However, in monitoring forest fires, the most significant variable from a temperature sensor is the maximum temperature sensed by one or more of the temperature sensors. Thus, in this example, an XML router compares two values from two temperature sensors and only passes along the highest of the two values. Further, the router continues to perform this function comparing pairs of data from pairs of temperature sensors, and only passes along the highest value received from any of a large number of temperature sensors in a sensor array to the data processing application 125.

Using this example, it should be apparent that, the subject matter described herein is dramatically more efficient than an approach that sends data from every sensor 102 to the data processing application 125. Further, it should be apparent that the subject matter described herein is superior to a system wherein a filter is installed on the network element 115 and sensor data from the sensors 102 passes through the filter installed on the network element 115 to the data processing application 125 when the sensor data from the sensors 102 exceeds the filtering threshold.

This is true because an extremely large number of the sensors 102 will sense data in excess of the threshold set for the filter when a forest fire exist. Thus, when a forest fire condition exists, the data processing application will still be overwhelmed with data in a system that merely installs a threshold filter for the data from the sensors 102 at the network element 115.

In various exemplary embodiments, the temperature sensor data from this network arrives at the data processing application already summarized, for example in the form of a rolling minute-average temperature over sections of the area (spatial aggregation), and a variance of the readings. If the rolling minute-average or variance suddenly becomes large, the data processing application identifies that change as corresponding to a sudden change in the environment being monitored. Specifically, in this example, the data processing application identifies that a fire has started.

In this example the data monitoring application has to look at only two numbers, the average of the data, and the variance of the data. The data processing application does not need to process data for each sensor in the data sensor network. Thus, in sensor networks having hundreds to thousands of sensors, the data aggregation scheme according to various exemplary embodiments results in a significant savings of bandwidth and processing power required to operate the monitoring application.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of processing data, comprising:
   identifying a first data processing criterion;
   communicating the first data processing criterion from a data processing application to a network element;
   receiving first sensor data from a plurality of sensors at the network element comprising an average and a variance of the sensor data;
   operating on the first sensor data at the network element to process the first sensor data according to the identified first data processing criterion, resulting in a first processed data result after either the average or the variance of the first sensor data exceeds a threshold, wherein the first processed data is a spatial aggregation of the first sensor data;
   transmitting the first processed data result from the network element to the data processing application; and
   processing the first processed data result at the data processing application resulting in a second processed data result.

2. The method of processing data, according to claim 1, further comprising:
   identifying a second data processing criterion;
   communicating the second data processing criterion from the data processing application to the network element;
   receiving second sensor data from the plurality of sensors at the network element;
   operating on the second sensor data at the network element to process the second sensor data according to the identified second data processing criterion, resulting in a third processed data result;
   transmitting the third processed data result from the network element to the data processing application; and
   processing the third processed data result at the data processing application resulting in a fourth processed data result.

3. The method of processing data, according to claim 1, wherein the network element is a router.

4. The method of processing data, according to claim 3, wherein the router is an XML router.

5. The method of processing data, according to claim 1, wherein the network element is a plurality of XML routers.

6. The method of processing data, according to claim 1, wherein a number of the plurality of sensors exceeds one hundred, and operating on the first sensor data at the network element to process the first sensor data according to the identified first data processing criteria includes operating on the first sensor data from each of the plurality of sensors.

7. The method of processing data, according to claim 6, wherein the number of the plurality of sensors exceeds one thousand.

8. The method of processing data, according to claim 1, wherein the first sensor data indicates a presence or absence of an attempted entry into a network that is unauthorized, and the second processed data result indicates a conclusion regarding whether an unauthorized entry to the network element was attempted.

9. The method of processing data, according to claim 1, wherein the first sensor data indicates a condition selected from a list consisting of motion, temperature, humidity, and a presence of an airborne substance.

10. The method of processing data, according to claim 1, wherein the first data processing criterion is selected from a list consisting of a geospatial criterion, a numeric criterion, and a temporal criterion.

11. The method of processing data, according to claim 10, wherein the geospatial criterion is selected from a street, a neighborhood, a municipal boundary, a political boundary, an institutional boundary, an elevation above sea level, an elevation above ground level, latitude, and longitude, the numeric criterion is selected from a list consisting of a minimum threshold, a maximum threshold, an average, a minimum threshold of an average, and a maximum threshold of an average, and the temporal criterion is selected from a list consisting of a textual attribute, satisfying a condition for a predetermined number of times consecutively, satisfying a condition for a predetermined number of times out of a larger predetermined number of consecutive times, and satisfying a condition for a predetermined number of times out of a sum of the predetermined number of times plus an additional buffer number of times.

12. The method of processing data, according to claim 1, wherein the network element receives the first sensor data from the plurality of sensors through the Internet, and the first processed data result is transmitted from the network element to the data processing application through the Internet.

13. A data processing system, comprising:
a plurality of sensors;
a network element that receives first sensor data comprising an average and a variance of the sensor data from the plurality of sensors, and processes the first sensor data according to a first data processing criterion resulting in a first processed data result smaller than a size of the first sensor data that is a spatial aggregation of the first sensor data, wherein only the average and the variance of the first sensor data are used after either the average or the variance of the first sensor data exceeds a threshold; and
a data processing workstation that is remote from the network element and includes a data processing application that processes the first processed data result to obtain a second processed data result, after either the average or the variance of the first sensor data exceeds the threshold.

14. The data processing system, according to claim 13, wherein the network element is a router.

15. The data processing system, according to claim 14, wherein the router is an XML router.

16. The data processing system, according to claim 13, wherein the network element is a plurality of XML routers.

17. The data processing system, according to claim 13, wherein a number of the plurality of sensors exceeds one hundred.

18. The data processing system, according to claim 13, wherein a number of the plurality of sensors exceeds one thousand.

* * * * *